(12) United States Patent
Ortigosa Vallejo et al.

(10) Patent No.: US 7,222,798 B2
(45) Date of Patent: May 29, 2007

(54) CONTACTLESS IDENTIFICATION DEVICE

(75) Inventors: Juan Ignacio Ortigosa Vallejo, Barcelona (ES); Carles Puente Ballarda, Barcelona (ES)

(73) Assignee: Fractus, S.A., Sant Cugat del Vallés (ES)

( * ) Notice: Subject to any disclaimer, the term of this patent is extended or adjusted under 35 U.S.C. 154(b) by 0 days.

(21) Appl. No.: 10/858,457

(22) Filed: Jun. 1, 2004

(65) Prior Publication Data
US 2005/0161514 A1  Jul. 28, 2005

Related U.S. Application Data

(63) Continuation of application No. PCT/EP01/14453, filed on Dec. 10, 2001.

(51) Int. Cl.
*G06K 19/06* (2006.01)
(52) U.S. Cl. .................... 235/492; 235/487
(58) Field of Classification Search ............ 235/375, 235/487, 492, 494
See application file for complete search history.

(56) References Cited

U.S. PATENT DOCUMENTS

| | | | |
|---|---|---|---|
| 5,172,084 A * | 12/1992 | Fiedziuszko et al. | 333/204 |
| 5,337,063 A | 8/1994 | Takahira | |
| 6,140,975 A | 10/2000 | Cohen | |
| 6,147,655 A | 11/2000 | Roesner | |
| 6,285,342 B1 | 9/2001 | Brady et al. | |
| 6,421,013 B1 | 7/2002 | Chung | |
| 6,535,175 B2 | 3/2003 | Brady et al. | |
| 6,563,463 B1 * | 5/2003 | Saito | 343/700 MS |
| 6,677,917 B2 | 1/2004 | Van Heerden et al. | |
| 6,870,507 B2 * | 3/2005 | Anguera Pros et al. | 343/700 MS |
| 2002/0005433 A1 * | 1/2002 | Nochi et al. | 235/492 |
| 2003/0142036 A1 * | 7/2003 | Wilhelm et al. | 343/909 |
| 2004/0217916 A1 * | 11/2004 | Quintero Illera et al. | 343/895 |

FOREIGN PATENT DOCUMENTS

| | | | |
|---|---|---|---|
| WO | WO 01/54221 | * | 1/2000 |
| WO | WO 01/22528 | | 3/2001 |
| WO | 0154221 | | 7/2001 |
| WO | 0154225 | | 7/2001 |

OTHER PUBLICATIONS

Xianming Quig, et al., "A Novel Single-Feed Circular Polarized Slotted Loop Antenna", 1999, IEEE, (4 pages).

* cited by examiner

*Primary Examiner*—Daniel StCyr
(74) *Attorney, Agent, or Firm*—Winstead PC

(57) ABSTRACT

The invention relates to a contact-less identification device comprising a flat conducting structure as an electromagnetic sensor or transducer, and more particularly the invention relates to contactless cards, hybrid cards and radio operated electronic labels and tags. The electromagnetic sensor architecture according to the invention is suitable for all the applications where contactless or hybrid cards are of advantage: high volume paying and toll applications (public transportation, public sport events, person and good identification, access to controlled areas, control of shipment of goods, handling of luggage, product control in chain production environments), etc. The contact-less identification device according to the invention has had its performance enhanced by the use of space-filling techniques in the design of its electromagnetic sensor and by the use of a planar capacitor in conjunction with said flat conducting structure.

19 Claims, 11 Drawing Sheets

CONTACTLESS IDENTIFICATION DEVICE

CROSS REFERENCE TO RELATED APPLICATION

This application is a continuation of international PCT application No. PCT/EP01/14453 filed on Dec. 10, 2001.

OBJECT OF THE INVENTION

The invention relates, in general, to a contact-less identification device comprising a flat conducting structure as an electromagnetic sensor or transducer, and more particularly the invention relates to contactless cards, hybrid cards and radio operated electronic labels and tags. The electromagnetic sensor architecture according to the invention is suitable for all the applications where contactless or hybrid cards are of advantage: high volume paying and toll applications (public transportation, public sport events, person and good identification, access to controlled areas, control of shipment of goods, handling of luggage, product control in chain production environments), etc.

The contact-less identification device has had its performance enhanced by the use of space-filling techniques in the design of its electromagnetic sensor and by the use of a planar capacitor in conjunction with said flat conducting structure.

BACKGROUND OF THE INVENTION

The use of Integrated Circuit (IC) cards has been going on for several years in multiple applications. These applications range, in terms of complexity, from simple token-wise payment applications in private environments to complex and intrinsically secure electronic banking applications including powerful encryption and decryption mechanisms. The interaction of the IC in the card with the reader is made through a set of metallic contacts on the surface of the card.

The public interest in many of today's applications of IC cards is greatly increased if the operation of the card does not require a mechanical interaction of the user with the reading device, thus allowing a much faster operation and an increased roughness of the reader that reflects in an increase in the reliability of the system. This is one of the main reasons for the development, which continues today with new standards being defined and tested, of the contactless operation of IC cards and electronic labels or tags.

There has been some effort put in the development of the electromagnetic sensor to be used in the contactless operation of the cards, but the outcome of this development has been the design of the electromagnetic sensor architectures that are not optimally using the available space within the card or tag.

In low frequency applications, where the coupling of the IC chip to the contactless reader is made via an inductive coupling, the most common solution has been the use of multiple-turn coils (see (2) in FIG. 10), which imply quite a complicated manufacturing process because of the fact that the two ends of the coils are located in different sides with respect to the coil windings (see bridge (3) in FIG. 10). Other simpler solutions such as (1) are convenient in terms of manufacturing simplicity, but feature a poor in performance.

In applications at higher frequencies, the minimum size of the electromagnetic sensor is determined by the wavelength at the operation frequency, and this fact implies that there is a clear compromise between the performance of the electromagnetic sensor and its size. This compromise has been solved with a limitation of the electromagnetic sensor size to values that are suitable for the final product, at the expense of obtaining electromagnetic sensor performances that are far from optimal.

The set of geometries named Space-Filling Curves (hereinafter SFC) were described in the patent publication WO 01/54225 wherein said space-filling curve was defined as a curve composed by at least ten connected straight segments, wherein said segments are smaller than a tenth of the operating free-space wave length and they are spatially arranged in such a way that none of said adjacent and connected segments form another longer straight segment, wherein non of said segments intersect to each other except optionally at the tips of the curve, wherein the corners formed by each pair of said adjacent segments can be optionally rounded or smoothed otherwise, and wherein the curve can be optionally periodic along a fixed straight direction of space if and only if the period is defined by a non-periodic curve composed by at least ten connected segments and no pair of said adjacent and connected segments define a straight longer segment.

In said document the space-filling curve features a box-counting dimension larger than one, being said box-counting dimension computed as the slope of the straight portion of a log-log graph, wherein such a straight portion is substantially defined as a straight segment over at least an octave of scales on the horizontal axes of the log-log graph.

SUMMARY OF THE INVENTION

The present invention optimizes the performance of the electromagnetic sensor or inductive element used in the contactless cards, hybrid cards and radio frequency operated labels and tags by incorporating a capacitive element connected in parallel to the electromagnetic sensor and by including in the design of the electromagnetic sensor geometry, in the capacitive element geometry, or in both cases the use of space-filling curves (SFC). This allows an optimal utilization of the limited area and volume within the card or label.

This invention is aimed at two main goals: on one hand, it presents a new procedure to improve the performance of electromagnetic sensors designed for inductive coupling, and on the other hand this invention portrays the advantages of using space-filling curves in order to optimize the solution to the performance-size compromise in applications for radiation coupling.

In applications where the radio frequency operation of the device implies an inductive coupling of the sensor to the electromagnetic field generated by the coupling device (the card/label reader), this method allows the optimization the electromagnetic sensor inductance (the main characteristic of the electromagnetic sensor for this type of coupling) in several ways:

First: By the use of SFC, the length of the electromagnetic sensor or inductive element can be substantially increased without exceeding the area allowed in the card or label for the deployment of the electromagnetic sensor, thus increasing the inductance of the electromagnetic sensor or inductive element.

Second: By the inclusion of a suitably designed capacitive element connected in parallel to the electromagnetic sensor, the effective inductance that the pair capacitance/inductance presents to the card integrated circuit can be increased without affecting other operation parameters.

Third: By the optimization of the inductance value of the electromagnetic sensor it is possible to achieve values of this parameter that are suitable for the operation of the contactless or hybrid card or the radio operated electronic label without having to use multiple-turn loops. This possibility is very interesting because it makes it possible to locate the two connection terminals of the electromagnetic sensor or inductive element in the internal region of the loop without the need to have a conductive path crossing over the loops, thus greatly simplifying the manufacturing techniques.

Fourth: because of the above-mentioned features, contactless cards, hybrid cards and radio frequency operated labels and tags can be reduced in size with respect to prior art.

Fifth: because of the above-mentioned features, contacless cards, hybrid cards and radio frequency operated labels and tags can be operated from a longer distance to the card detection device compared to those in the prior art.

In applications working at higher frequencies, where the operation of the device implies a radiation coupling (more that an inductive coupling) to the electromagnetic field generated by the coupling device (the card/label reader), this method allows an optimization of the electromagnetic sensor performance by allowing a reduction in the electromagnetic sensor size required for it to operate at the working frequency.

By the use of SFC's in this method, the use of the area where the electromagnetic sensor is being deployed is optimized, as the space-filling curves are able to pack a longer length in a smaller space than conventional curves (as meander-like curves or spiral curves).

In terms of manufacturing suitability, the fact that the electromagnetic sensor or inductive element can be manufactured without the need to cross over conductive paths allows the manufacturing of the electromagnetic sensor with a single layer construction method.

DETAILED DESCRIPTION OF THE PREFERRED EMBODIMENTS

Figure 1:
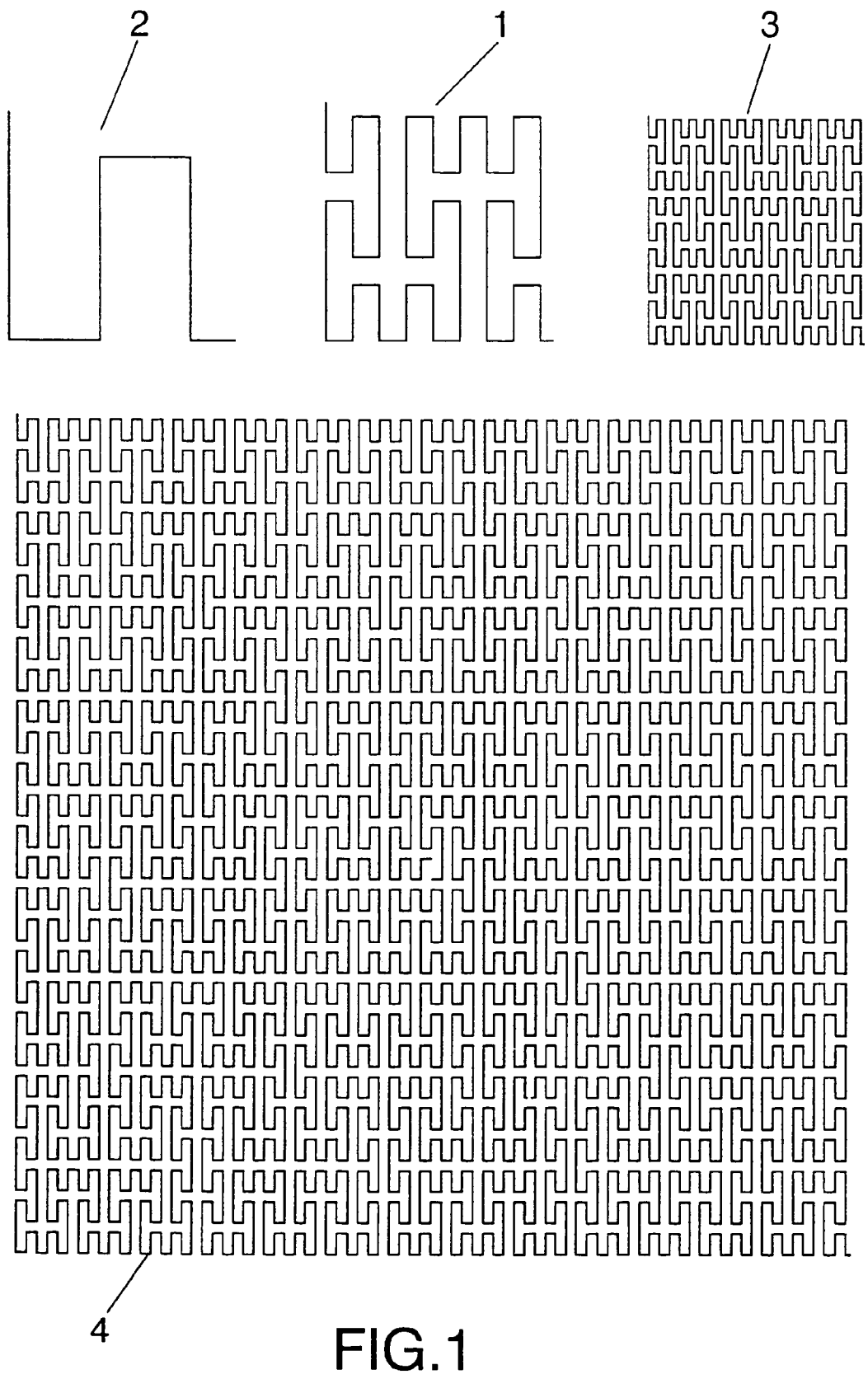
FIG. 1 shows some particular cases of SFC curves. From an initial curve 2, other curves 1, 3 and 4 with more than 10 connected segments are formed. This particular family of curves are named hereafter SZ curves.
Figure 2:
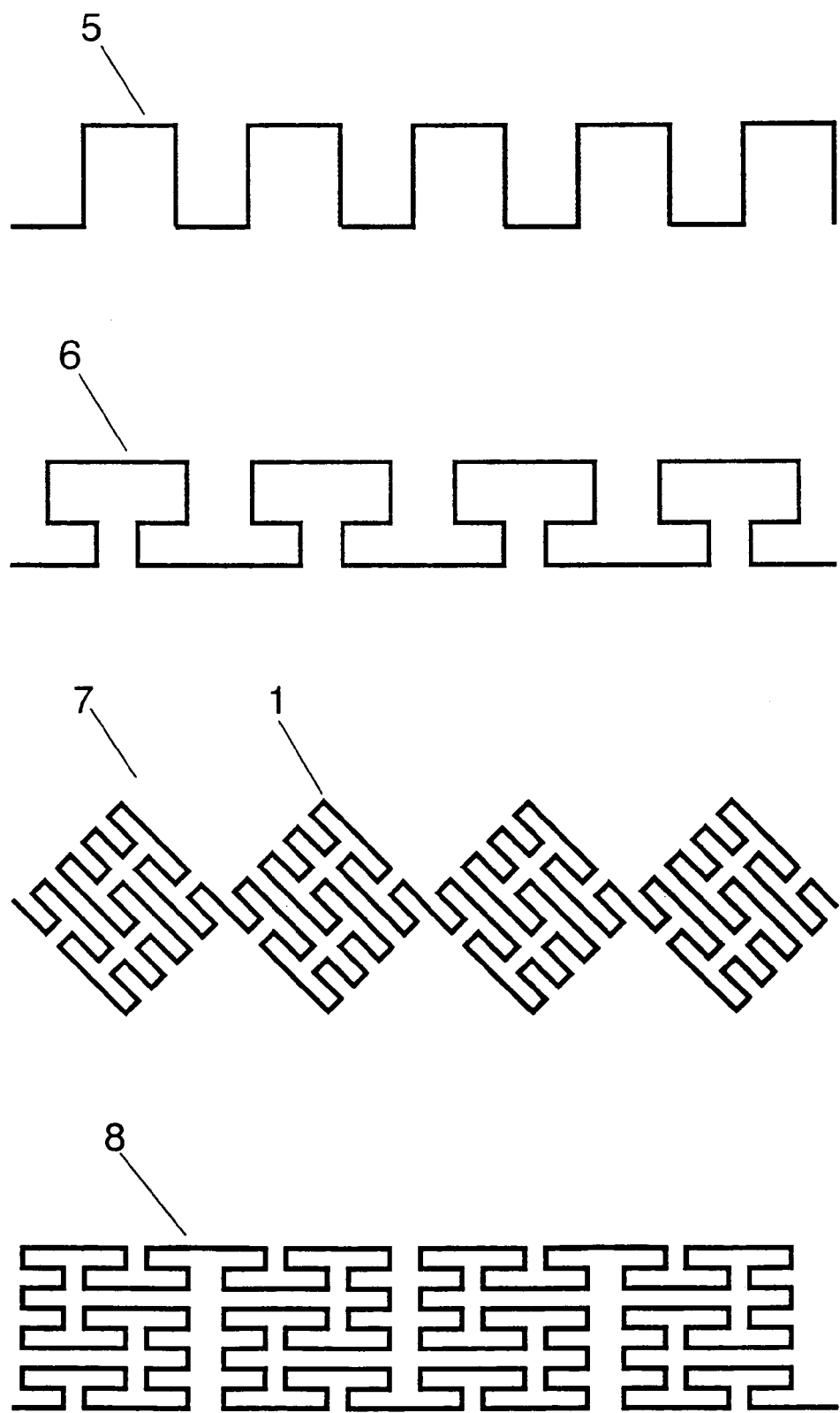
FIG. 2 shows a comparison between two prior art meandering lines (5 and 6) and two SFC periodic curves 7 and 8, constructed from the SZ curve of drawing 1. Periodic Curves 5 and 6 are not SFC because their periods are defined with less than ten segments.
Figure 3:
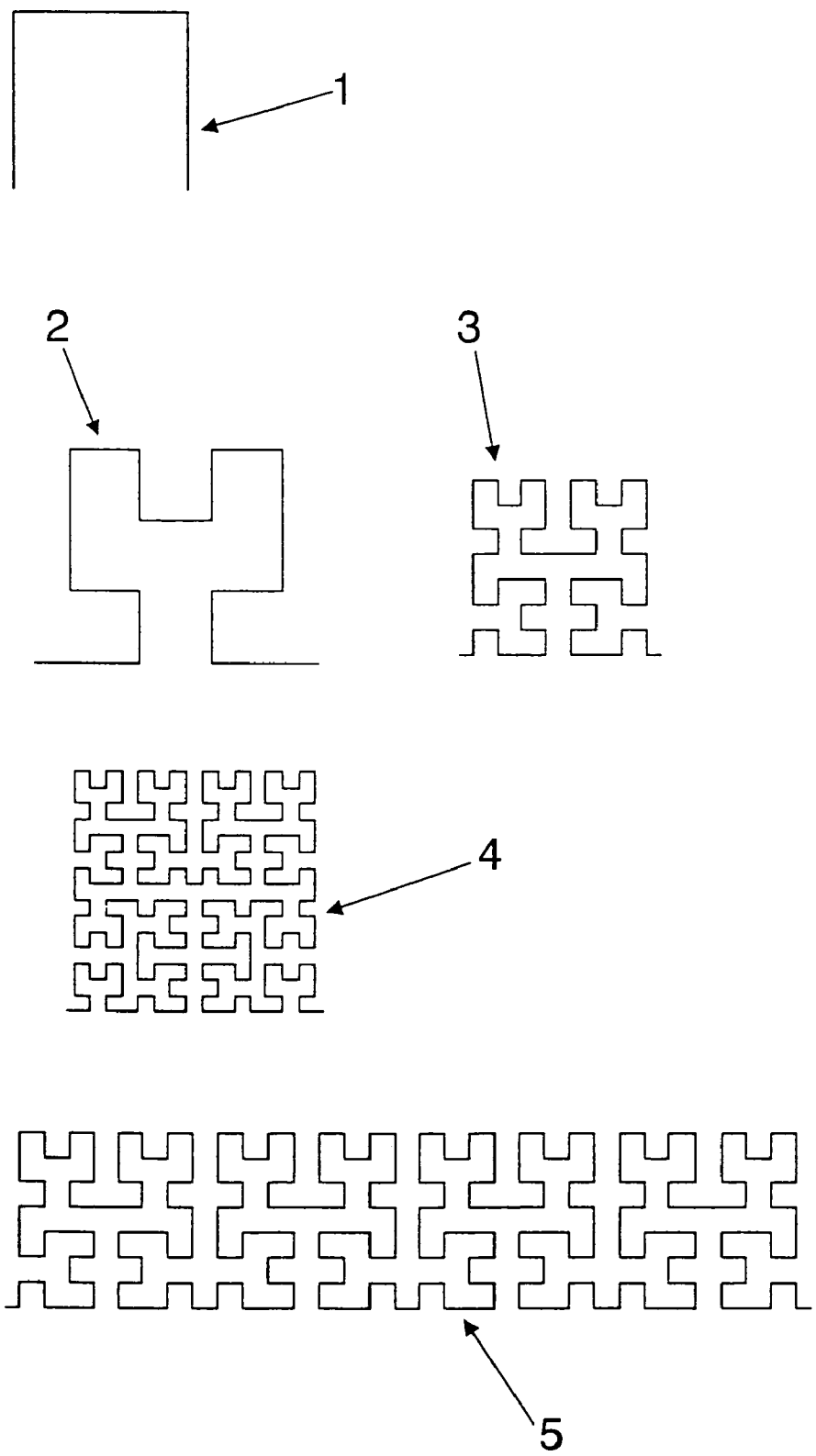
FIG. 3 shows a set of SFC curves (1, 2, 3, 4, 5) inspired on the Hilbert curve and hereafter named as Hilbert curves.
Figure 4:
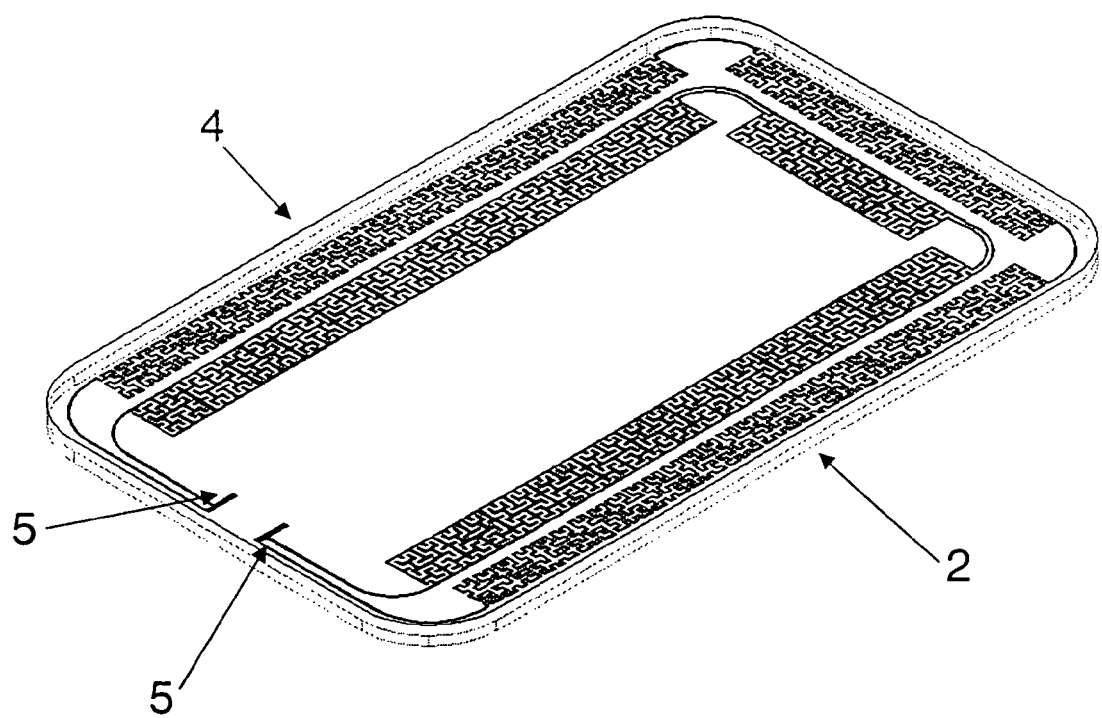
FIG. 4 shows a particular configuration of an electromagnetic sensor for contactless or hybrid cards. It consists on a flat single-turn rounded-corner rectangular loop with part of the straight segments that form the loop shaped as a SFC curve (2), and a coplanar flat capacitor connected in parallel to the loop with its gap shaped as a SFC curve (4). The electromagnetic sensor is connected to the contactless or hybrid card chip at the connection points (5).

FIG. 4 describes, without any limiting purpose, a preferred embodiment of a contactless identification device in particular a contactless or hybrid card comprising a pace-filling enhanced electromagnetic sensor. It is composed of a single-turn loop connected in parallel to a capacitor. A single-turn flat loop electromagnetic sensor in the shape of a round-cornered rectangle has been modified by replacing some of the straight lines that form the sides of the loop by a space-filling curve (SFC) (2). In this particular example, a particular case of a SFC (the Hilbert curve) has been chosen, but other SFC could be used instead. A flat coplanar capacitor is connected in parallel to the ends of the loop electromagnetic sensor. The gap of the flat capacitor has been modified by shaping it as a space-filling curve (SFC) (4). In this particular example, a particular case of a SFC (the Hilbert curve) has been chosen, but other SFC could be used instead. The two ends of the loop and the capacitor form the connecting terminals of the electromagnetic sensor (5).

This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards (6). For reasons of external appearance, the electromagnetic sensor is usually integrated in some of the inner layers of the card body. The connecting points of the contactless card chip would be connected to the electromagnetic sensor connecting terminals by means of any of the available procedures, such as for instance using conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located.

As it can be appreciated from FIG. 4, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of the mechanical tasks required to connect the contactless chip or implant and connect the hybrid card chip (as drilling, depositing of conductive pastes, soldering, etc.).

This electromagnetic sensor architecture is suitable for all the applications where contactless or hybrid cards are of advantage: high volume paying and toll applications (public transportation, public sport events, etc.), person and good identification (access to controlled areas, control of shipment of goods, handling of luggage, product control in chain production environments, etc.), etc.

Figure 5:
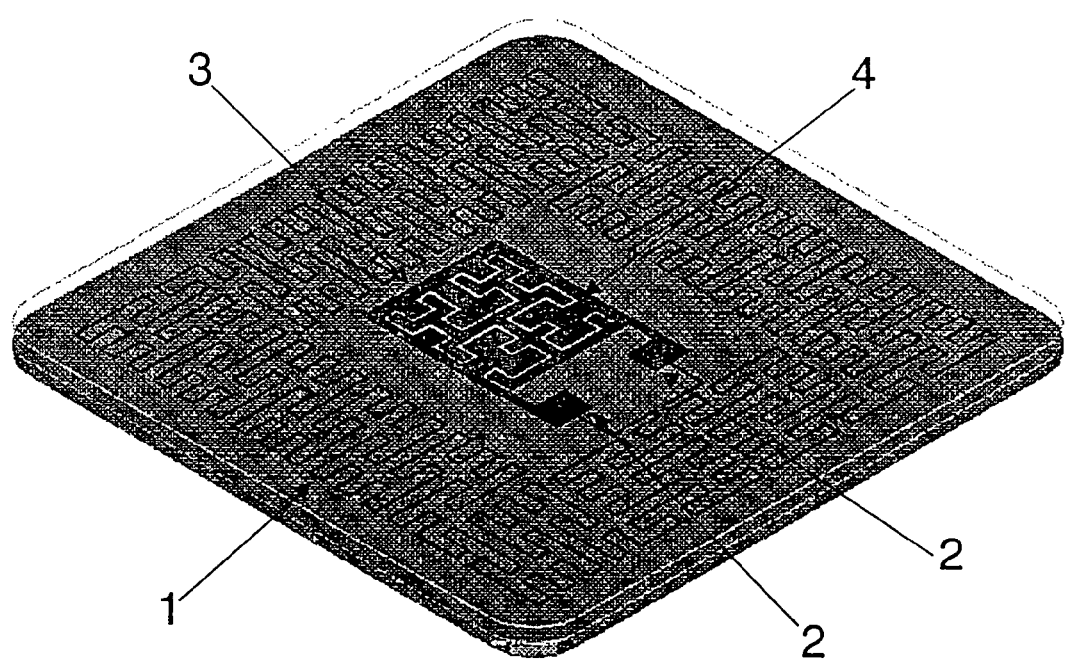
FIG. 5 shows a particular configuration of an electromagnetic sensor for electronic label or tag. It consists on a single turn square flat loop with the straight lines that form the loop shaped as a SFC curve (1), and a coplanar flat capacitor (3) connected in parallel to the loop with its gap (4) shaped as a SFC curve. The electromagnetic sensor is connected to the electronic label chip or electronic tag chip at the connection points (2).

FIG. 5 describes another preferred embodiment of a space-filling enhanced electromagnetic sensor for a electronic label or radio frequency operated tag. A square flat loop has been modified by substituting the straight parts of the loop wire by SFC structures (1). In this particular example, a particular case of a SFC (the SZ curve) has been chosen, but other SFC could be used instead. The two ends of the arms form the connecting terminals of the electromagnetic sensor (2). At the same time, a flat coplanar capacitor (3) is shown connected in parallel to the electromagnetic sensor connection terminals. The shape of the gap of the capacitor (4) has been modified with a SFC curve. In this particular example, a particular case of a SFC (the Hilbert curve) has been chosen, but other SFC could be used instead. The capacitance of the capacitor and the inductance of the loop form a parallel resonant circuit. This electromagnetic sensor can be manufactured, among other techniques, by means of any of the current printed circuit fabrication techniques, by means of conductive ink printed on a dielectric sheet-shaped substrate, etc. The antenna is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals. As it can be appreciated from FIG. 5, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of mechanical tasks as drilling, depositing of conductive pastes, soldering, etc. This electromagnetic sensor architecture is suitable for all the applications where radio operated electronic label or electronic tags are of advantage: shopping antitheft applications, contactless intelligent shopping karts, identification of goods and control of stocks in real time, etc.

Figure 6:
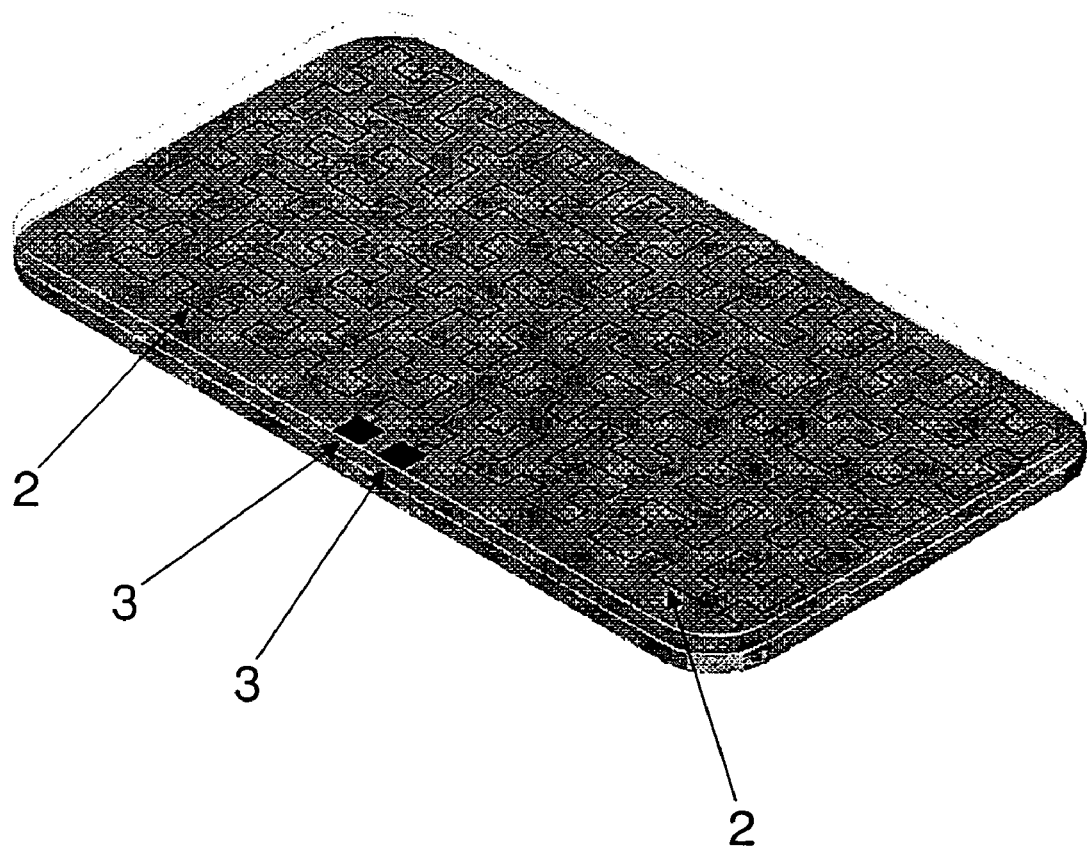
FIG. 6 shows an example of a dipole electromagnetic sensor for an electronic label of radio frequency operated electronic tag, wherein each of the dipole arms (2) is shaped as an SFC curve. The electronic label chip or the electronic tag chip is connected at the terminals of the electromagnetic sensor (3).

Another preferred embodiment for a space-filling enhanced electromagnetic sensor for a electronic label or radio frequency operated tag is shown in FIG. 6. A wire dipole electromagnetic sensor has been modified by substituting the dipole arms (2) by SFC curves. In this particular example, a particular case of a SFC (the Hilbert curve) has been chosen, but other SFC could be used instead. The two ends of the arms form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 7:
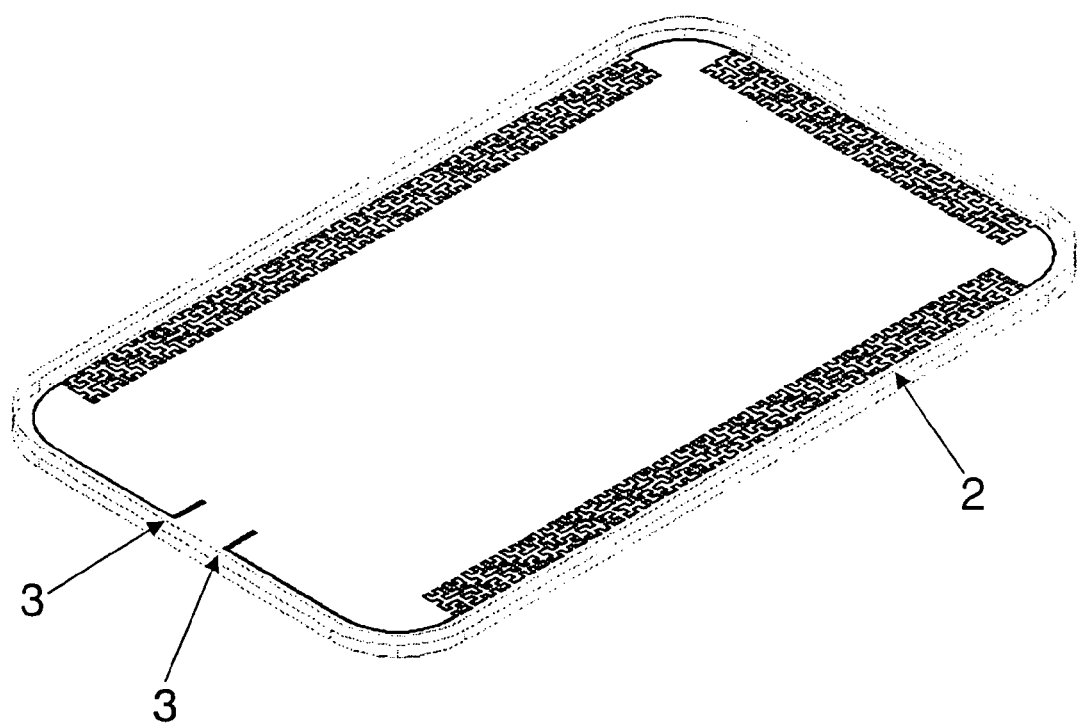
FIG. 7 shows a particular configuration of an electromagnetic sensor for contactless or hybrid cards. It consists on a flat single-turn rounded-corner rectangular loop whit part of the straight segments that form the loop shaped as a SFC curve (2). The electromagnetic sensor is connected to the contactless or hybrid card chip at the connection points (3).

FIG. 7 describes another preferred embodiment of a space-filling enhanced electromagnetic sensor for a contactless or hybrid card. A single-turn flat loop in the shape of a round-cornered rectangle (2) has been modified by replacing some of the straight lines that form the sides of the loop by a space-filling curve (SFC). In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards. For reasons of external appearance, the electromagnetic sensor is usually integrated in some of the inner layers of the card body. The connecting points of the contactless card chip would be connected to the electromagnetic sensor connecting terminals by means of conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located. With this new single-turn loop electromagnetic sensor architecture the need of wires crossing over other parts of the electromagnetic sensor is eliminated, and therefore the manufacturability of the system is greatly simplified as it is not necessary to include extra layers in the card body to allow the positioning of both electromagnetic sensor connecting terminals at the side of the electromagnetic sensor loop.

Figure 8:
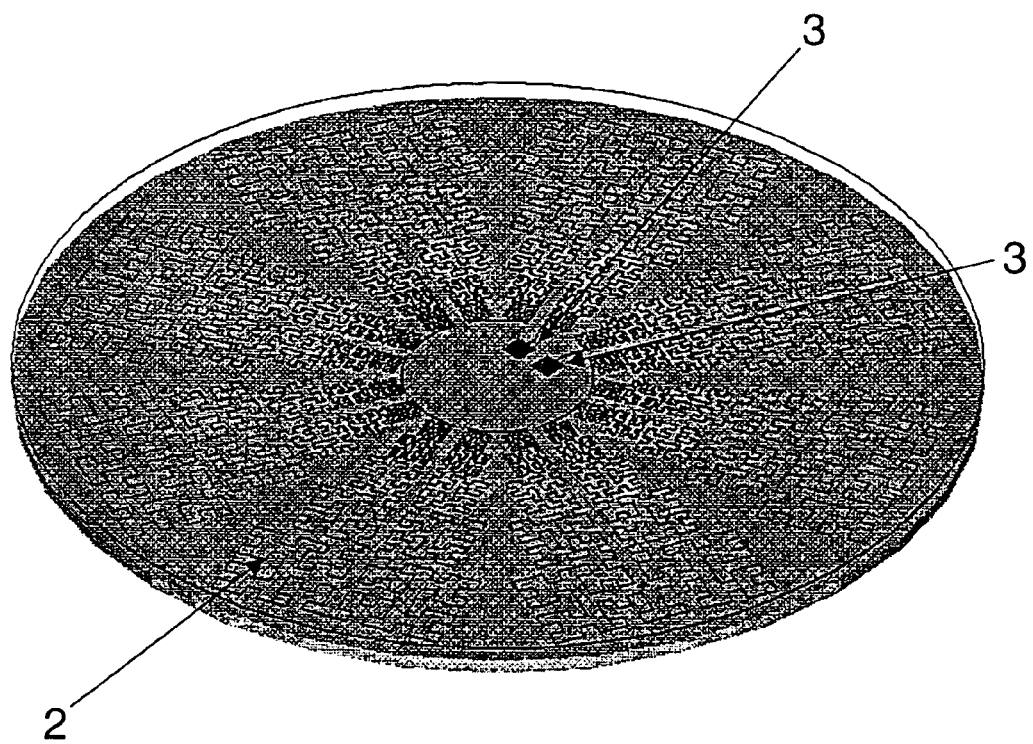
FIG. 8 shows an example of a loop antenna for an electronic label of radio frequency operated electronic tag, wherein a flat single-turn circular loop has been modified by including radially-oriented SFC curves (2). The electronic label chip or the electronic tag chip is connected at the terminals of the electromagnetic sensor (3).

FIG. 8 describes another preferred embodiment of a space-filling enhanced electromagnetic sensor for a electronic label or radio frequency operated tag. A single-turn flat circular loop has been modified by including radially-oriented SFC structures (2) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 9:
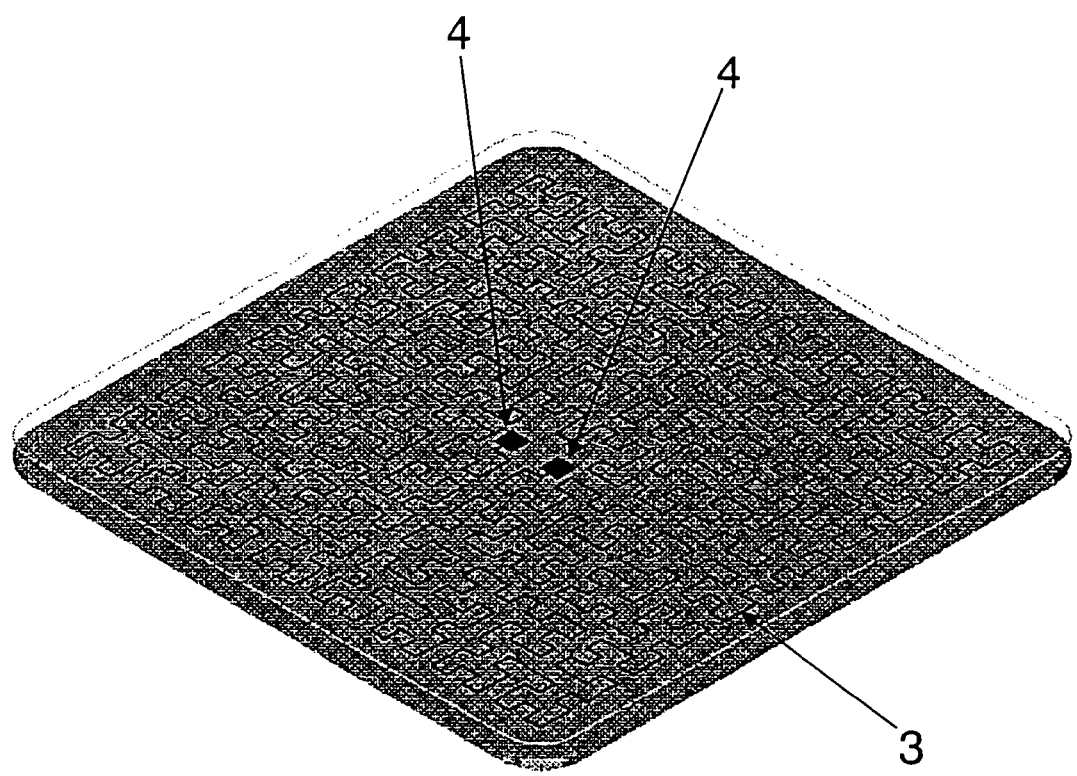
FIG. 9 shows an example of a lop electromagnetic sensor for an electronic label or radio frequency operated electronic tag, where in a flat single-turn square loop has been modified by including a SFC curve (3). The electronic label chip or the electronic tag chip is connected at the terminals of the electromagnetic sensor (4).
Figure 10:
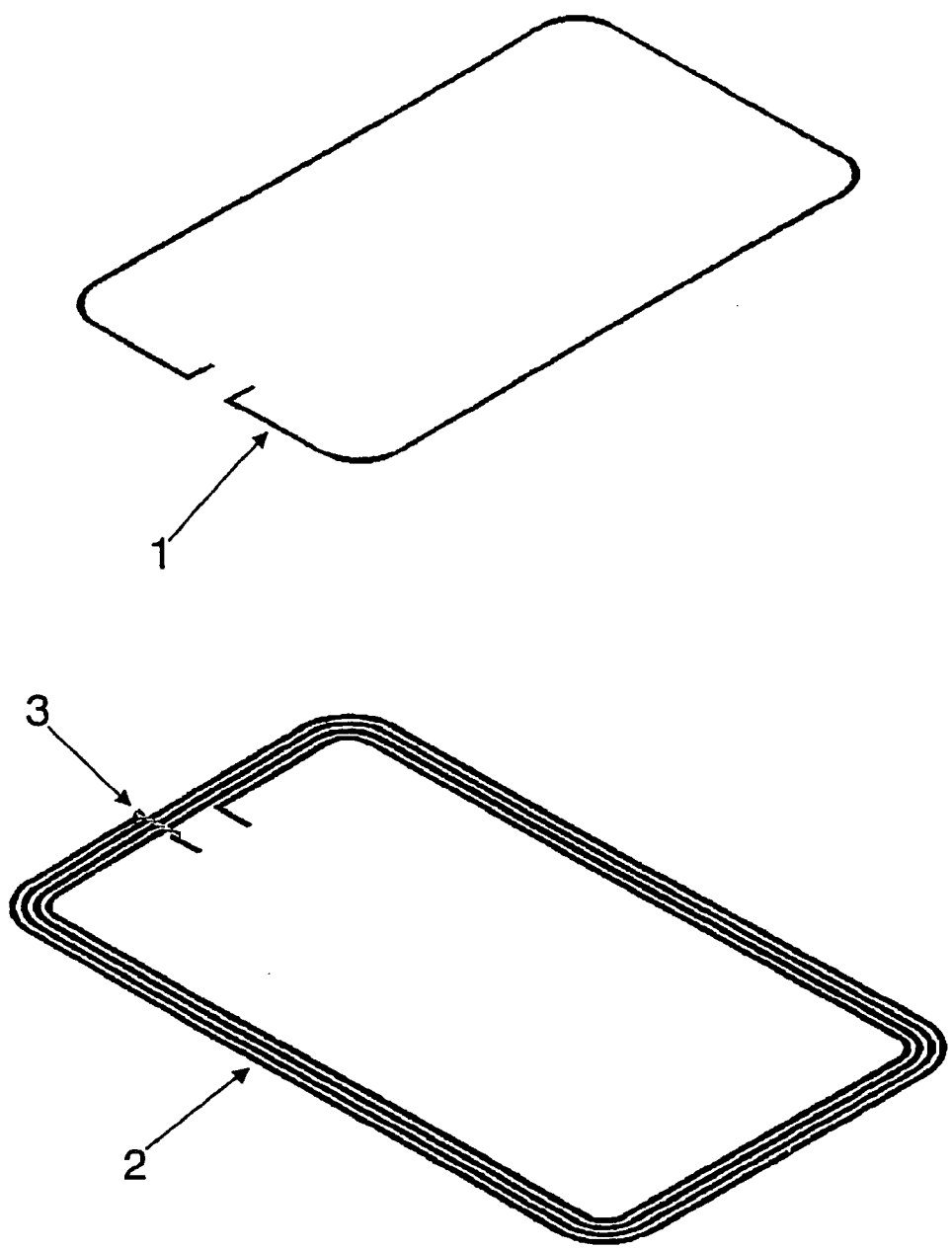
FIG. 10 shows two examples of current art in the design of electromagnetic sensor for contactless or hybrid cards. A single-turn flat loop (1) and a multiple-turn flat loop (2) are presented. The most important detail is the use of a wire running at a higher (3) level to overcome the need to cross over the loop windings and locate the two electromagnetic sensor contacts in the same side of the loop.

FIG. 9 describes another preferred embodiment of a space-filling enhanced electromagnetic sensor for a electronic label or radio frequency operated tag. A single-turn flat squared loop has been modified by including SFC curves (3) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two ends of the loop form the connecting terminals of the electromagnetic sensor (4). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 11:
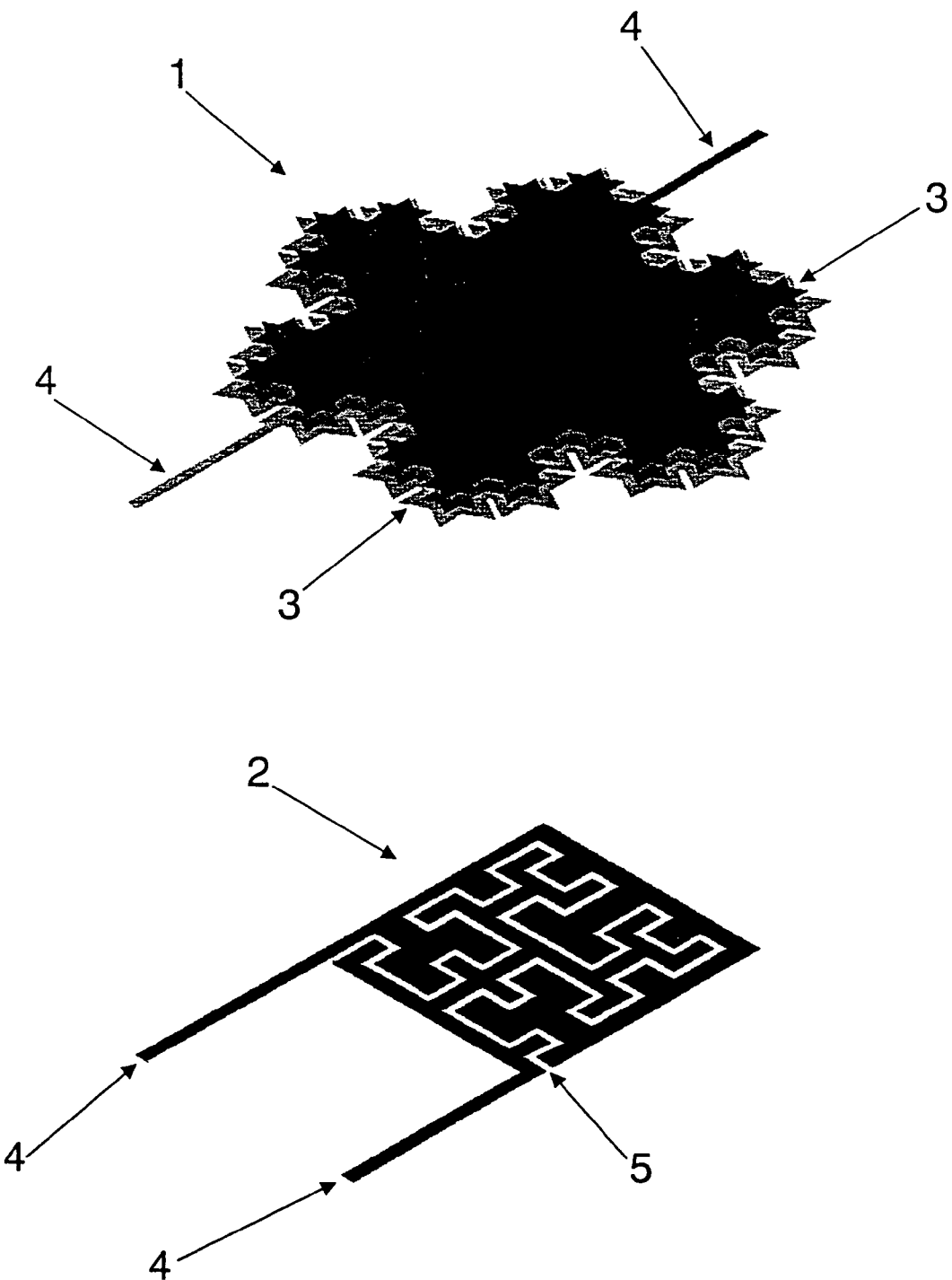
FIG. 11 shows two examples of capacitive elements with space-filling curves applied to their shapes. In a parallel plate capacitor (1), the conductive surfaces (3) have been shaped a space-filling curve. In a coplanar capacitor (2), the shape of the gap between the conductive surfaces (5) has been shaped following a space-filling curve.

FIG. 11 describes, without any limiting purpose, two examples of preferred embodiments of capacitors with the application of space-filling curves to their shape. In a parallel plate capacitor (1) the two parallel conducting surfaces have been shaped following a space-filling curve. The capacitance of the element depends on the thickness of the insulating layer between the parallel plates, the kind of dielectric between the plates, and the effective area of the plates. Each of the two connecting terminals of the element (4) is connected to one of the plates. This capacitor can be manufactured, among other techniques, by means of any of the current printed circuit fabrication techniques, by means of conductive ink printed on a dielectric sheet-shaped substrate, etc., taking always into account that two conductive layers, separated by an insulating layer of a determined thickness, are required. The final element would be encapsulated with some dielectric material in order to prevent damaging of the parallel plates, while leaving the connection terminals out of the encapsulation. In a coplanar capacitor (2), and taking into account that the capacitance value is determined mainly by the length and the width of the gap between the coplanar conductive surfaces (5), the gap has been shaped following a space-filling curve, thus maximizing the length of the gap without increasing the total area of the component. This capacitor can be manufactured, among other techniques, by means of any of the current printed circuit fabrication techniques, by means of conductive ink printed on a dielectric sheet-shaped substrate, etc. In this type of capacitors, only one layer of conductive surface is required, making it especially suitable for mass production. After the shaping of the two coplanar conductive surfaces, the whole structure would be encapsulated with some dielectric material in order to prevent damaging of the conductive surfaces, while leaving the connection terminals (4) out of the encapsulation.

The invention claimed is:

1. A contactless identification device comprising:
    an integrated circuit;
    a conducting wire or strip as an electromagnetic sensor; and
    a capacitive element connected in parallel with said conducting wire or strip;
    wherein the conducting wire or strip is a single-turn flat conducting wire and the capacitive element is a flat coplanar capacitor;
    wherein the conducting wire or strip and the capacitive element are lying on a common single layer of the device;
    wherein the capacitive element is surrounded by the conducting wire or strip;
    wherein at least one of at least a portion of said conducting wire or strip and at least a portion of said capacitive element is shaped as a space-filling curve;
    wherein the space-filling curve is defined as a curve composed by at least ten connected straight segments;
    wherein said segments are smaller than a tenth of the operating free-space wave length and are spatially arranged so that none of said adjacent and connected segments form another longer straight segment.

2. The contactless identification device according to claim 1 wherein said segments intersect to each other at the tips of the curve.

3. The contactless identification device according to claims 1 or 2 wherein the corners formed by each pair of said adjacent segments are rounded or smoothed.

4. The contactless identification device according to claim 1 wherein the curve is periodic along a fixed straight direction of space if and only if the period is defined by a non-periodic curve composed by at least ten connected segments and no pair of said adjacent and connected segments define a straight longer segment.

5. The contactless identification device, according claim 1, wherein:
    at least one of at least a part of said conducting wire or strip and at least a part of said capacitive element is shaped as a space-filling curve;
    said space-filling curve features a box-counting dimension larger than one;
    said box-counting dimension is computed as the slope of the straight portion of a log-log graph;
    such a straight portion is substantially defined as a straight segment over at least an octave of scales on the horizontal axes of the log-log graph.

6. The contactless identification device according to claim 1, wherein at least one of at least a part of said conducting wire or strip and at least a part of said capacitive element is shaped either as a Hilbert or a Peano curve.

7. The contactless identification device according to claim 1 wherein at least one of at least a part of said conducting wire or strip and at least a part of said capacitive element is shaped as an SZ, ZZ, Hilbertzz, Peanoinc, Peanodec or Peanozz curve.

8. The contactless identification device according to claim 1, wherein said conducting wire or strip is shaped as a single-turn flat loop, in which at least a part of said loop is shaped as a space-filling curve.

9. The contactless identification device according to claim 1, wherein the conducting wire or strip forms a dipole electromagnetic sensor comprising two conducting arms in which at least a part of said conducting arms is shaped either as an space-filling curve, Hilbert, Peano, HilbertZZ, SZ, Peanoinc, Peanodec, PeanoZZ, or ZZ.

10. The contactless identification device, according to claim 1, wherein said capacitive element comprises two parallel conducting surfaces separated by a layer of insulating material and at least a part of said conducting surfaces is shaped as a space-filling curve.

11. The contactless identification device according to claim 1, wherein said capacitive element comprises two conducting coplanar surfaces separated by a gap between said coplanar metallic surfaces and at least a part of said gap or said conducting surfaces is shaped as a space-filling curve.

12. The contactless identification device according to claim 1, wherein at least one of the conductive wire or strip and the capacitive element is integrated in some of the inner layers of the identification device body.

13. The contactless identification device according to claim 1 wherein the conducting strip is a single-turn flat circular loop which includes radially-oriented space-filling structures.

14. The contactless identification device according to claim 1 wherein the conducting strip is a flat single-turn loop.

15. A method of manufacturing a contactless identification device, the method comprising:
   forming a single-turn flat conducting strip and a flat coplanar capacitor element on a common single layer of a dielectric substrate so that the conducting strip and the capacitor element are connected in parallel;
   wherein the coplanar capacitor element is surrounded by the conducting strip and
   wherein at least one of the conducting strip and the capacitor element are formed following a space-filling curve.

16. The method according to claim 15 wherein the conducting strip and the capacitor are formed by printing conductive ink on a sheet-shaped substrate.

17. The method according to claim 15 wherein the conducting strip and the capacitor are formed by means of electrolytic etching part of a metal layer of a metal-dielectric sandwich sheet.

18. The method according to claim 15 wherein the conductive strip and the capacitor are integrated in one of the inner layers of a card body, an electronic label or radio frequency operated tag.

19. The method according to claim 15 wherein connecting terminals are formed in the connecting points between the conducting strip and the capacitor element, and a card chip is connected to said connecting terminals.

* * * * *